March 21, 1939.　　　L. G. GREEN　　　2,151,322
GOLD SAVER
Filed April 20, 1937　　　2 Sheets-Sheet 1
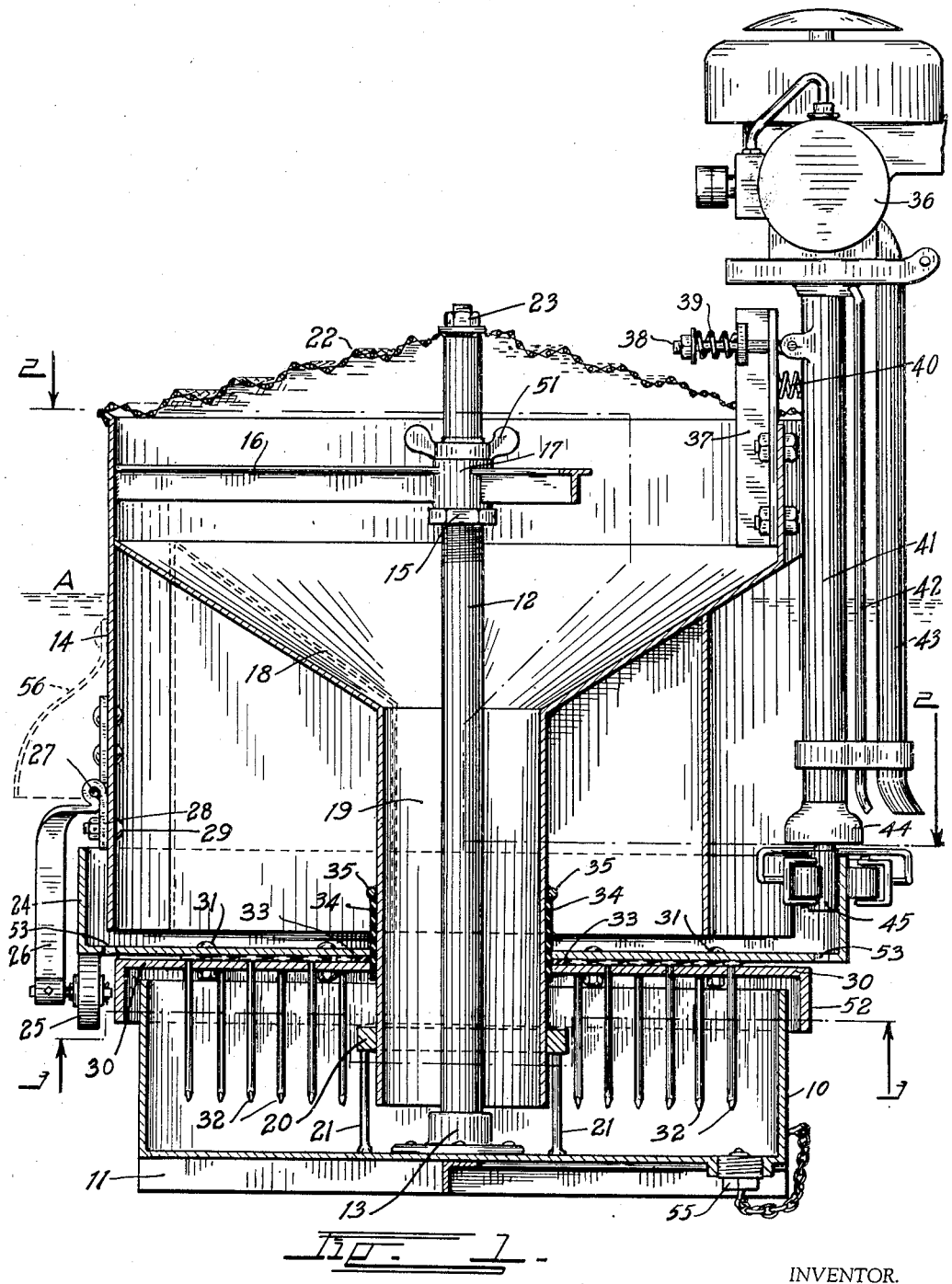
INVENTOR.
LLOYD G. GREEN.
BY
ATTORNEY.

March 21, 1939.  L. G. GREEN  2,151,322
GOLD SAVER
Filed April 20, 1937  2 Sheets-Sheet 2
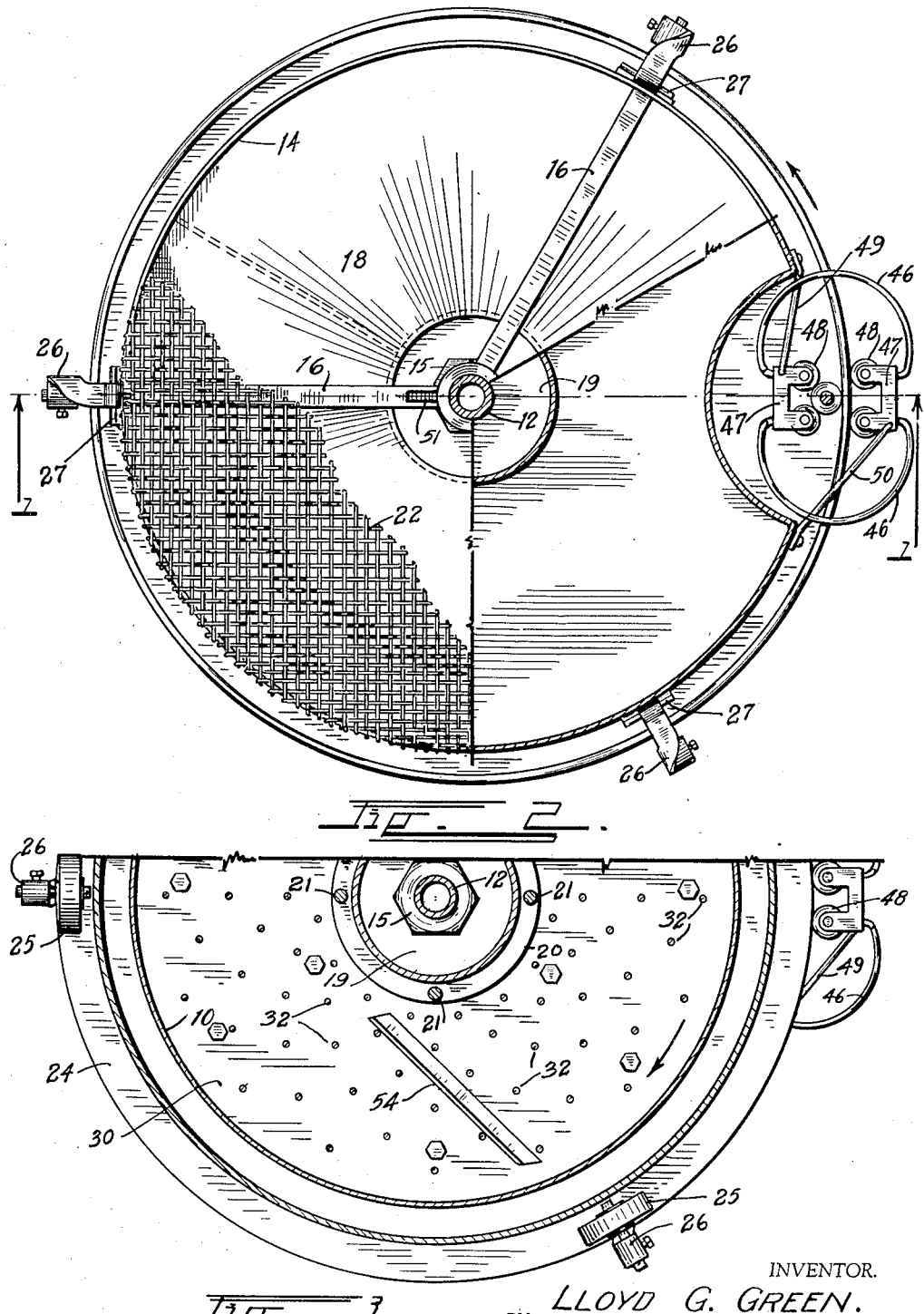
INVENTOR.
LLOYD G. GREEN.
BY
ATTORNEY.

Patented Mar. 21, 1939

2,151,322

UNITED STATES PATENT OFFICE 2,151,322

GOLD SAVER

Lloyd G. Green, Denver, Colo.

Application April 20, 1937, Serial No. 137,902

7 Claims. (Cl. 209—465)

This invention relates to a gold saving machine and has for its principal object the provision of a simple, highly efficient, portable machine in which the concentrating or recovering will be accomplished below the water level of a stream so that the water displacement will have a buoyant effect on the sands to assist in the separation of the fine heavier particles therefrom and in which the current of the stream will be prevented from interfering with the recovery of the fine flour or flake gold.

Another object of the invention is to construct a machine of this character which will be easily portable so that it can be readily moved from place to place along the stream as desired.

Other objects are to provide a portable power supply which can be quickly and easily applied to the machine or carried therewith and which will not require gears, chains, sprockets, etc., so as to eliminate the wear encountered when working in sand and gravel; to provide means for quickly removing the coarse gravel and boulders from the sand; and to provide a machine in which access can be quickly had to the collected values.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a vertical section through the improved machine taken on the line 1—1, Fig. 2.

Fig. 2 is a horizontal section taken on the line 2—2, Fig. 1.

Fig. 3 is a horizontal section looking upwardly taken on the line 3—3, Fig. 1.

The invention comprises a base pan 10 supported on angle iron base members 11 and provided with a suitable drain plug 55. A vertical standard 12 extends upwardly from a supporting flange fitting 13 in the middle of the pan 10. A cylindrical housing 14 is supported by the standard 12 over the base pan 10. The housing 14 is supported on a nut 15 threaded on the standard 12 by means of suitable spokes 16 extending from a hub member 17 on the standard 12.

A hopper 18 is formed in the housing 14 and extends inwardly and downwardly to a vertical feed tube 19, the lower extremity of which terminates above the bottom of the pan 10. A guide ring 20 is supported above the bottom of the pan 10 upon suitable posts 21 to maintain the feed tube 19 concentric with the pan.

The top of the housing 14 is closed by means of an inclined conical screen 22 which is formed with a series of concentric hollows or channels to prevent material from rolling from the screen too rapidly. The screen is held in place by a removable clamp nut 23 threaded on a stud in the top of the standard 12. A lock nut 51 clamps the spider hub 17 against the nut 15 to prevent the housing from rotating.

A rotary pan 24 is suspended below the housing 19. The latter pan has a greater diameter than the housing and extends outwardly beyond the housing. The projecting portion of the rotary pan rides upon a series of rollers 25 carried upon hinged hangers 26. The hangers 26 are suspended from suitable hinge pins 27 and extend downwardly along the outside of the housing as shown at 28. These downwardly extending portions are clamped to the housing by means of clamp bolts 29 which lock the brackets down and hold the rollers beneath the edge of the rotating pan. The pan 24 is provided with drain openings 53 at its outer edge to drain any accumulated water and sand therefrom when the machine is removed from the stream. By loosening the nuts on the bolts 29, the brackets may be swung outwardly to release the pan 24.

A perforated plate 30 is clamped to the bottom of the rotating pan 24 by means of suitable clamp bolts 31. A series of nail-like, headed members, designated herein as nails 32, are passed through the perforations of the plate 30 and extend downwardly into the pan 10 with their heads clamped between the plate 30 and the pan 24. An inclined angle scraper 54 is also secured to the bottom of the plate 30. At the outer edge of the plate 31 is a downwardly extending skirt 52.

A rubber gasket 33 is clamped between the plate and the pan and extends inwardly to make a snug joint around the feed tube 19. To protect the feed tube 19 at the point of friction where it passes through the pan 24, a rubber sleeve 34 is placed around the feed tube 19 at this point. The lower edge of the sleeve rests on the ring 20 and a second ring 35 is placed around the feed tube to prevent the sleeve from traveling upwardly.

The pan 24 may be rotated in any desired manner and from any desired means. A very satisfactory method for rotating the pan is illustrated in the drawings and comprises a gasoline motor 36, of the out-board type as used on motor boats and the like. The motor is mounted upon an angle bracket 37 extending upwardly from the housing 14. At the point of mounting the housing is intended to provide space for the motor and its mechanism.

Motors of this type are provided with a mounting stud 38. This stud is passed directly through the angle bracket 37 and is clamped thereto by a compression spring 39 which absorbs the vibration of the motor. A second compression spring 40 is positioned on the opposite side of the bracket 37 for a similar purpose. Such motors have downwardly extending shaft housings 41, cooling water pipe 42, and exhaust pipe 43.

The lower extremity of the shaft housing 41 for use on this machine terminates in a thrust bearing 44 through which the motor shaft extends and terminates in a resilient roller 45. The roller 45 is pressed tightly against the inner face of the edge of the pan 24 by means of a pair of arched springs 46 which act against opposed roller frames 47.

Each of the roller frames carries a pair of pressure rollers 48. The outer rollers 48 bear against the outer surface of the pan rim and the inner rollers 48 bear against the drive roller 45 to force it tightly against the pan. The inner roller frame 47 is prevented from moving with the pan by means of a tie member 49 and the outer roller is similarly held in place by means of a tie member 50 extending to the housing 14.

This provides what might be termed a universal motor mounting which allows the drive roller to move and follow any irregularities in the pan rim.

Operation

In use, the entire machine is set in the water of a stream to a depth as indicated by the water line "A" of Fig. 1. The water level may be anywhere between the bottom of the housing and the top screen 22.

The motor 36 is started to cause the pan 24 to rotate. Sand and gravel is shoveled onto the screen 22. The coarser rocks and gravel roll from the screen. The finer sand passes through the screen into the hopper 18, falls through the feed tube 19 to the bottom of the pan 10 to fill the latter.

The rotation of the pan 24 causes the nails 32 to travel on annular paths through the accumulated sand constantly agitating it so that the gold and heavier particles gravitate to the bottom of the pan 10, while the sand is kept in suspension in the water. The pressure of the incoming sand causes the sand in the pan 10 to migrate, under the influence of the moving nails, toward the outside thereof until it overflows the outer edge. The light valueless sands rise to the top immediately and are scraped to the edge by the inclined scraper 54.

The movement of the sand from the feed tube 19 to the over flow is very gradual since it is distributed over the entire pan area so that ample opportunity is allowed for the settling of the gold. The machine is cleared by lifting it from the stream and inclining it while in operation this removes the major portion of the sand over the pan edge. The remainder, carrying the recovered values, is drawn off through the drain plug 55.

The outer skirt 52 prevents the water in the stream from flowing into and through the pan 10 to disturb the normal settling action and to prevent the carrying away of the finer values. A shield 56 may be projected outwardly from the housing over the projecting pan 24 to prevent sand and gravel from falling into the latter, as indicated in broken line in Fig. 1.

If it is found that the sand is passing too rapidly through the machine, the nut 15 may be lowered so as to reduce the discharge opening from the tube 19 and also to reduce the discharge opening between the pan 10 and the pan 24.

The machine is particularly valuable for saving the fine flour or flake gold that in the ordinary sluicing devices is carried away by the flowing current of water. In this machine there are no currents. The water is used only for imparting buoyancy to the sand.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A gold saver comprising: a circular pan; a standard extending upwardly from the middle of said pan; an adjusting nut on said standard; a feed hopper suspended from said nut; a feed tube extending downwardly from said hopper about said standard and terminating above the bottom of said pan; a rotary plate surrounding said feed tube over said pan; rollers suspending said plate from said feed hopper; a perforated clamping plate bolted to the bottom of said rotary plate; a series of nails extending through said perforated plate and extending downward into said pan with their heads clamped between said perforated plate and said rotary plate; and means for rotating said plate so that said nails will travel in annular paths in said pan.

2. A gold saver comprising: a circular pan; a standard extending upwardly from the middle of said pan; an adjusting nut on said standard; a feed hopper suspended from said nut; a feed tube extending downwardly from said hopper about said standard and terminating above the bottom of said pan, a second vertical-sided pan of larger diameter than said first pan; means for rotatably suspending said second pan, with its edge extending upwardly, over said first pan; agitating members extending downwardly from the bottom of said second pan into said first pan; a drive motor; a roller driven by said drive member; and means for clamping the said roller against the up-turned edge of said second pan to rotate the latter.

3. A gold saver comprising: a circular base pan; a standard arising from the middle of said base pan to a point above the top thereof; a cylindrical housing supported by said standard over said base pan; a hopper formed in and supported by said housing; a vertical feed tube extending downwardly from said hopper about said standard and terminating adjacent the bottom of said base pan; a rotary pan positioned between said housing and said base pan; rollers carried from said housing and supporting said rotary pan; and agitating members extending downwardly from said rotary pan into said base pan.

4. A gold saver comprising: a circular base pan; a standard arising from the middle of said base pan to a point above the top thereof; a cylindrical housing supported by said standard over said base pan; a hopper formed in and supported by said housing; a vertical feed tube extending downwardly from said hopper about said standard and terminating adjacent the bottom of said base pan; a rotary pan positioned between said housing and said base pan; rollers carried from said housing and supporting said rotary pan; agitating members extending downwardly from said rotary pan into said base pan; an upturned flange on said rotary pan surrounding the lower extremity of said housing; and driving means engaging said flange for rotating said base pan.

5. A gold saver comprising: a circular base pan; a standard arising from the middle of said base pan to a point above the top thereof; a cylindrical housing supported by said standard over said base pan; a hopper formed in and supported by said housing; a vertical feed tube extending downwardly from said hopper about said standard and terminating adjacent the bottom of said base pan; a rotary pan positioned between said housing and said base pan; rollers carried from said housing and supporting said rotary pan; agitating members extending donwwardly from said rotary pan into said base pan; an upturned flange on said rotary pan surrounding the lower extremity of said housing; driving means engaging said flange for rotating said base pan; a perforated plate clamped to the bottom of said rotary pan; and headed agitating members extending downwardly in said plate with their heads gripped between said plate and said rotary pan.

6. A gold saver comprising: a circular base pan; a standard arising from the middle of said base pan to a point above the top thereof; a cylindrical housing formed in and supported by said housing; a vertical feed tube extending downwardly from said hopper about said standard and terminating adjacent the bottom of said base pan; a rotary pan positioned between said housing and said base pan; rollers carried from said housing and supporting said rotary pan; agitating members extending downwardly from said rotary pan into said base pan; a nut threaded on said standard; bracket members extending from said housing to said standard and supported by said nut so that the spacing between said housing and said base pan may be varied by adjusting said nut.

7. A gold saver comprising: a circular base pan; a standard arising from the middle of said base pan to a point above the top thereof; a cylindrical housing supported by said standard over said base pan; a hopper formed in and supported by said housing; a vertical feed tube extending downwardly from said hopper about said standard and terminating adjacent the bottom of said base pan; a rotary pan positioned between said housing and said base pan; rollers carried from said housing and supporting said rotary pan; agitating members extending downwardly from said rotary pan into said base pan; and a conical screen supported at its center by said standard and at its periphery by said housing and covering the latter.

LLOYD G. GREEN.